H. J. SHERRILL.
PROPELLING MECHANISM FOR BICYCLES AND THE LIKE.
APPLICATION FILED JULY 22, 1912.
1,079,444.
Patented Nov. 25, 1913.
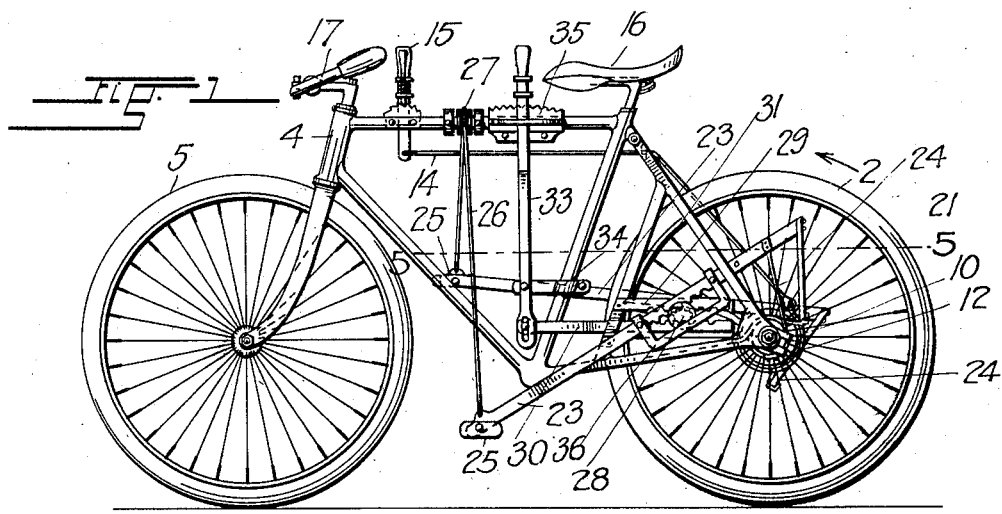
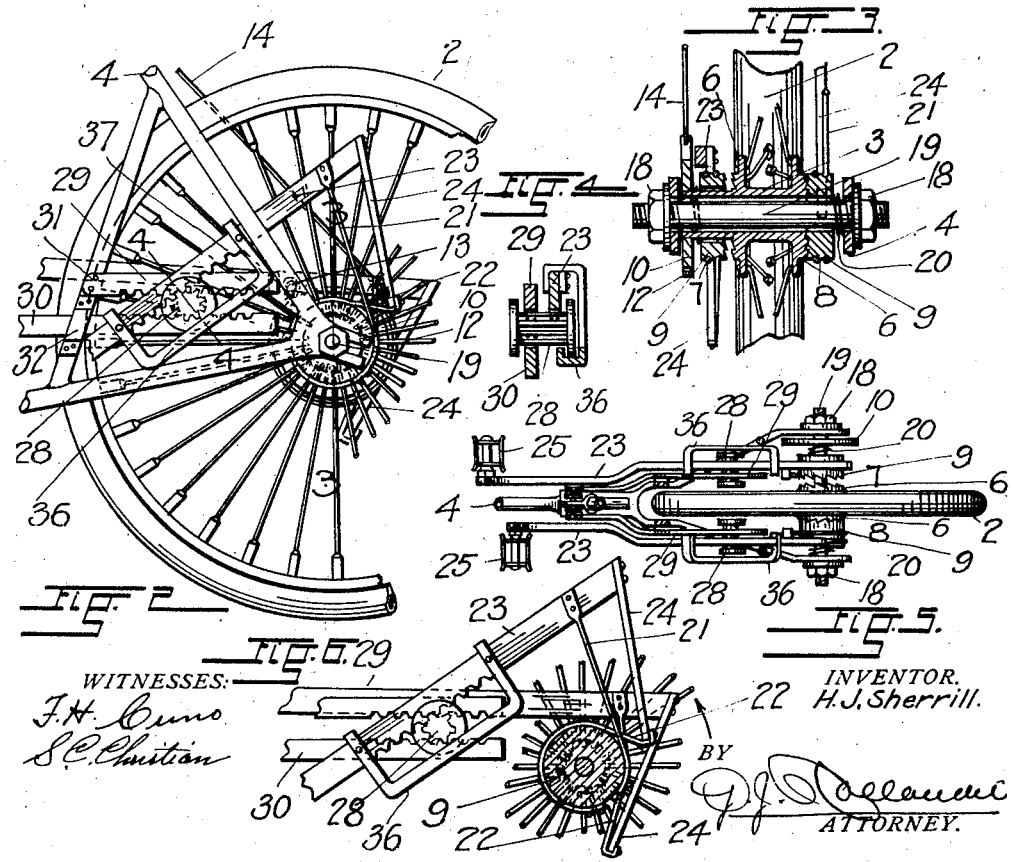

UNITED STATES PATENT OFFICE.

HARRY J. SHERRILL, OF SALIDA, COLORADO.

PROPELLING MECHANISM FOR BICYCLES AND THE LIKE.

1,079,444.

Specification of Letters Patent.

Patented Nov. 25, 1913.

Application filed July 22, 1912. Serial No. 710,827.

*To all whom it may concern:*

Be it known that I, HARRY J. SHERRILL, a citizen of the United States, residing at Salida, in the county of Chaffee and State of Colorado, have invented certain new and useful Improvements in Propelling Mechanism for Bicycles and the like, of which the following is a specification.

My invention relates to improvements in propelling mechanisms for bicycles and the like, and its object resides in the provision of an adjustable mechanism of this character in which simplicity of construction is combined with great efficiency. I attain this object by the mechanism illustrated in the accompanying drawings in the various views of which like parts are similarly designated, and in which—

Figure 1 represents a side-elevation of my improved bicycle, Fig. 2, a fragmentary side view of the driving wheel of the same and adjacent portions of the bicycle frame and the propelling mechanism, Fig. 3, a vertical section taken along the line 3—3 Fig. 2, Fig. 4, a transverse section taken along the line 4—4 Fig. 2, Fig. 5, a horizontal section along the line 5—5 Fig. 1, and Fig. 6, a side elevation of the parts of the propelling mechanism connected immediately with the driving-wheel of the vehicle.

Referring to the drawings, the numeral 2 designates the rear or driving wheel of a bicycle, the hub 3 of which is rotatably mounted upon an axle 19 secured to the rear fork of the diamond frame 4 which, as usual, is at its front end supported upon the steering wheel 5.

Formed integral with the hub 3 at opposite sides of its center, are the members 6 of two power-transmission clutches 7 and 8, the other, rotary members 9 of which are loosely mounted upon the hub. The latter is furthermore provided at one of its ends, with the wheel 10 of a hand-brake, the strap 12 of which is attached at one end to the frame of the bicycle, as at 13, and at its opposite end to a cord 14 which connects it with an operating lever 15 mounted on the frame between the seat 16 and the handle bars 17. The opposite surfaces of the two members 6 and 9 of each of the clutches are formed with radial ratchet teeth which are slanted to interlock for securing the rotative continuity of the two members when the driving member 9 is rotated in a forward direction, and which when the last mentioned member rotates in the opposite direction, will cause it to move loosely on the hub of the wheel 2, independent of its correlative.

Nuts 18 are applied at the threaded ends of the axle 19 to secure it to the rear fork of the frame, and springs 20 coiled around the said axle between the driving members 9 of the two clutches and the parts of the frame to which the axle is attached, serve to normally maintain the correlative members of the clutches in their interlocking position.

The rotary members 9 of the two transmission-devices are each provided with two circumferential grooves for the reception of ropes or belts 21 and 22, which at one of their ends are connected to the respective member and which, extending in opposite directions through the respective grooves, are attached at their opposite ends to the short arms of tread-levers 23, which are fulcrumed at opposite sides of the frame 4. The ropes 21, which in the operation of the mechanism serve to rotate the clutch-members to which they are attached, by unwinding from the same during upward movement of the arms of the levers with which they are connected, are secured to the latter at points adjacent their outer extremities, and the ropes 22 which are provided to rewind the ropes 21 on the members 9 by rotating the latter in the opposite direction during downward movement of the said arms, are attached at the lower ends of arms 24 which extend downwardly from the outer ends of the levers in angular relation to the same. The long arms of the levers are bent inwardly to bring the points at which the propelling force is applied, substantially in alinement with the points at which said force is transmitted to the driving wheel of the vehicle, they carry at their forward ends, pedals 25 of the usual construction and they are connected to oscillate simultaneously in opposite directions, by means of a cord 26 which runs over a sheave 27 on the top bar of the bicycle frame.

The fulcrums of the two levers 23 are established by means of pinions 28, preferably of the lantern type, which are mounted between two pairs of parallel racks 29 and 30, extending at opposite sides of the frame 4. The racks 29 of the two pairs are fixedly secured to the frame as at 31, and the other racks 30 of the same are slidably mounted in bearings 32 on the frame and connected with a lever 33 which is fulcrumed on a bracket 34 secured to a suitable part of the frame. A segment 35 on the top bar of the frame, is provided to secure the lever 33 in its adjusted position.

The levers 23 are provided along one of their edges with series of teeth 37, which mesh with those of the pinions 28 upon which said levers are supported, and guide bars 36 fixed on the levers in parallel relation to their toothed edges, serve to maintain their teeth in mesh with those of the respective pinions by engaging the latter at their lower sides.

By the above described arrangement, the pinions 28 may, by adjustment of the lever 33, be moved simultaneously along the pairs of racks between which they are mounted, without changing the position of the tread levers, and the rider is thus enabled to vary the proportional lengths of the arms of the two levers in accordance with the amount of power he desires to apply to the driving wheel of the vehicle.

When the rider moves the upper one of the pedals 25 downwardly by pressure of the foot, the pedal on the other lever is simultaneously raised by means of the cord 26; the downward movement of the long arm of the one lever about its fulcrum, causes by the upward movement of its short arm, the cord 21 to unwind from the driving member 9, with which it is connected and to thereby impart to the same a rotary movement in the forward direction which movement is through the instrumentality of the member 6 of the clutch at the same side of the vehicle, transmitted to the hub of the driving wheel 2. The simultaneous downward movement of the short arm of the tread lever at the opposite side of the vehicle will at the same time cause the cord 22 to unwind from the driving member of the respective clutch, thereby rewinding the propelling cord 21 on the second member, to impart a rotary movement to the latter when the said lever is subsequently moved downwardly by pressure upon its pedal. It will thus be seen that in the operation of my invention, the motive force is continuously transmitted to the driving wheel of the vehicle by alternate actions of the driving-members of its two transmission clutches, and that the proportion between the amount of energy transmitted to the driving wheel and the amount of power applied alternately to the two pedals, may be regulated to a limited degree, by the driver while the vehicle is in motion, by adjustment of the lever 33.

Having thus described my invention what I claim and desire to secure by Letters-Patent is:—

1. A vehicle comprising a frame, a rotary driving-wheel thereon, two pairs of parallel racks, one rack of each pair being fixed on the frame and the other having a linear movement on the same, a lever for moving the movable racks of the two pairs, pinions meshing respectively with the racks of the said pairs, levers having teeth in mesh with the respective pinions and connected to oscillate in unison in opposite directions, and means for converting alternate motions of said levers into a rotary movement of the said wheel in one direction.

2. The combination with the driving wheel of a vehicle, of transmission devices composed of clutch members fixed on said wheel, and rotary driving members adapted to separately transmit a rotary movement to said wheel in one direction by interlocking engagement with the respective clutch members, two oscillatory tread levers, a pair of cords attached at one of their ends to one of said levers and at their opposite ends, to one of the said driving members, a pair of cords attached at one of their ends to the other lever and at their opposite ends to the other driving member, the cords of each pair being wound upon the respective driving member in opposite directions whereby the cord unwound from the said member by the movement of the respective lever in one direction will be rewound upon the same by a rotary movement imparted to the said member by the unwinding of the other cord during the movement of the lever in the opposite direction, and means adapted to convert a downward movement of one of said levers into a simultaneous upward movement of the other lever.

3. The combination with the driving wheel of a vehicle, of transmission devices composed of clutch members fixed on said wheel and rotary driving members adapted to separately transmit a rotary movement to said wheel in one direction by interlocking engagement with the respective clutch members, two oscillatory tread levers, means adapted to convert a downward movement of one of said levers into a simultaneous upward movement of the other lever, cords attached at one of their ends to the said levers and wound upon the said guiding members to rotate the same by unwinding therefrom during downward movement of the respective levers, and means actuated by movement of the said levers in the opposite direction to rewind the said cords upon the respective driving members 4. A vehicle comprising a frame, a rotary driving wheel thereon, levers connected to oscillate in unison in opposite directions, means for converting alternate motions of said levers into a rotary movement of said wheel in one direction, fulcrums for said levers adjustable on said frame, and means for adjusting said fulcrums, adapted to normally secure them in their adjusted positions on the said frame.

In testimony whereof I have affixed my signature in presence of two witnesses.

HARRY J. SHERRILL.

Witnesses:
G. J. ROLLANDET,
P. RHOADES.